United States Patent

Yoshikawa et al.

Patent Number: 5,762,042
Date of Patent: Jun. 9, 1998

[54] INTERNAL COMBUSTION ENGINE

[75] Inventors: Satoshi Yoshikawa, Otsu; Katsunori Ueda, Kyoto; Takashi Kawabe, Kyoto; Hideyuki Oda, Kyoto; Kenji Goto, Kyoto; Nobuaki Murakami, Kyoto, all of Japan

[73] Assignee: Mitsubishi Jidosha Kogyo Kabushiki Kaisha, Tokyo, Japan

[21] Appl. No.: 808,432

[22] Filed: Feb. 28, 1997

[30]  Foreign Application Priority Data

Feb. 29, 1996 [JP] Japan .................... 8-043455

[51] Int. Cl.$^6$ ........................................ F02B 31/00
[52] U.S. Cl. ............... 123/308; 123/188.14; 123/193.5
[58] Field of Search ........................ 123/308, 193.5, 123/188.14, 302

[56]  References Cited

U.S. PATENT DOCUMENTS

| | | | |
|---|---|---|---|
| 3,973,548 | 8/1976 | Celli | 123/90.1 |
| 5,148,781 | 9/1992 | Piatti | 123/193.5 |
| 5,305,720 | 4/1994 | Ando et al. | |
| 5,463,995 | 11/1995 | Sakai et al. | 123/308 |
| 5,487,365 | 1/1996 | Isaka | 123/308 |
| 5,535,714 | 7/1996 | Aoyama et al. | 123/193.5 |

FOREIGN PATENT DOCUMENTS 61-261644  11/1986  Japan .
63-113115   5/1988  Japan .

Primary Examiner—Erick R. Solis

[57]  ABSTRACT

An internal combustion engine includes a cylinder head having a pair of upright intake ports formed therein on opposite sides of a plug hole extending along a cylinder axis, and each intake port has an upstream-side upright part extending from the top face of the cylinder head along the cylinder axis and a downstream-side slanting part having an intake opening communicating with a combustion chamber on one side of an imaginary plane containing the cylinder axis. An upper opening of each intake port opening in the top face of the cylinder head has a peripheral edge extending along the peripheral edge of an upper opening of the plug hole, and the peripheral edge of the upstream-side upright part extends along the outer surface of a lash adjuster. When viewed in vertical section along the imaginary plane, the upstream-side upright part extends obliquely downward from the top face of the cylinder head in a direction away from the lash adjuster, and the downstream-side slanting part approaches the plug hole with decrease in distance to the combustion chamber and then extends parallel to the plug hole. The downstream-side slanting part, when viewed in vertical section perpendicular to the imaginary plane, extends away from the cylinder axis with decrease in distance to the intake opening. With the intake ports having the above overall shape and sectional shape, each intake port can be given a required cross-sectional area without increasing the dimensions of the engine, and makes it possible to form a proper intake air flow inside the combustion chamber.

16 Claims, 6 Drawing Sheets

INTERNAL COMBUSTION ENGINE

BACKGROUND OF THE INVENTION

1. Field of the Invention

The present invention relates to an internal combustion engine installed in an automobile or the like, and more particularly, to an internal combustion engine capable of improving the suction efficiency, optimizing the shape of intake air flow, etc.

2. Description of the Related Art

In a fuel-injection spark-ignition type internal combustion engine installed in an automobile or the like, the air-fuel mixture supplied to the engine is made as lean as possible, taking the operating state of the engine into consideration, in order to reduce harmful components in the exhaust gas and improve the fuel consumption, etc. However, with conventional manifold-injection type internal combustion engines (hereinafter referred to as manifold-injection gasoline engines), there is a limit to the extent to which the mixture can be made lean. If, for example, the mixture is made too lean, then the stability of engine operation lowers. Consequently, a variety of cylinder-injection type internal combustion engines (hereinafter referred to as cylinder-injection gasoline engines) in which fuel is injected directly into the combustion chamber have been proposed.

In cylinder-injection gasoline engines, a fuel injector as well as a spark plug (more generally, a combustion device) are mounted to the cylinder head, and therefore, it is necessary that the overall shape and traverse cross-sectional shape of the intake port should be determined taking account of the positioning of the injector and the plug. For example, in an engine having a spark plug arranged at the upper central part of the combustion chamber so as to face the chamber, and a fuel injector arranged outward in the radial direction of the cylinder with respect to the intake valve, the intake port should desirably be formed so as to extend upright or straight from the top face of the cylinder head toward the combustion chamber at a location between the spark plug and the fuel injector, as disclosed in U.S. Pat. No. 5,305,720 etc. With the engine equipped with such an upright intake port, an intense reverse tumble flow (a vertical swirl flowing from the intake port toward the spark plug via the vicinity of the top face of the piston) is formed inside the combustion chamber, whereby the intake air flow containing fuel reaches the spark plug without being disturbed by the incoming intake air flow, thus achieving satisfactory combustion.

Apart from the cylinder-injection gasoline engines, some spark-ignition type internal combustion engines also are provided with upright intake ports, as disclosed in Unexamined Japanese Patent Publications (KOKAI) No. 61-261644 and No. 63-113115. These engines provided with upright intake ports have improved charging efficiency, enhanced mounting capacity of the engine in the engine room, etc. Especially, in an engine whose cylinders are arranged in V form or arranged horizontally, the width of the upper part of the engine can be reduced as small as possible. Also, since the intake manifold does not protrude from the side face of the cylinder head, the internal space of the engine room can be saved.

In the cylinder head provided with an upright intake port, the spark plug and the upright intake port are both arranged immediately above the combustion chamber, thus often making it difficult to lay out the elements located right above the combustion chamber. Particularly, in the case where the valve actuating system is a DOHC four-valve type or employs inner pivot-type swing arms, the upright intake port must inevitably be arranged close to the spark plug hole, in order to avoid the interference of the upright intake port with the intake/exhaust camshafts, lash adjusters and the like. As a result, the sectional or overall shape of the upright intake port necessarily becomes less satisfactory than intended, which often leads to reduction of the engine output or increase of harmful components in the exhaust gas due to deterioration in the suction efficiency or in the shape of intake air flow.

For example, in some engines having a pair of intake ports for each cylinder, the intake ports are formed in the cylinder head in such a manner that their openings in the top face of the cylinder head are located on opposite sides of the spark plug hole substantially in line along the axial direction of the crankshaft. If, in such engines, the overall engine length is reduced, then it is difficult to give each intake port a sufficient cross-sectional area. Also, in the case where each upright intake port has a straight overall shape and a circular traverse section, the distribution of intake air flow across the traverse section of the intake port is uniform and thus the intake air uniformly flows into the combustion chamber from the intake opening of the intake port, making it impossible to form an intense reverse tumble flow inside the combustion chamber.

Further, in some engines, two pairs of intake ports, that is, two upright intake ports and two slanting intake ports, are formed in the cylinder head per cylinder, as disclosed in Unexamined Japanese Patent Publication No. 63-113115. Each upright intake port and the slanting intake port associated therewith are arranged inside and outside, respectively, of the axis of the intake valve and communicate with a common intake opening shared by the two. In other words, the lower end portions of the individual intake ports are sharply curved toward the common intake opening, as viewed in vertical section. Consequently, the flows of intake air from these intake ports fiercely collide inside the combustion chamber, and the resultant turbulence impedes the formation of a reverse tumble flow.

SUMMARY OF THE INVENTION

An object of the present invention is to provide an internal combustion engine having an upright intake port with such a suitable shape as to improve the suction efficiency and optimize the flow of intake air within the combustion chamber.

An internal combustion engine according to one aspect of the present invention comprises a cylinder block having a cylinder formed therein, a piston slidably received in the cylinder, and a cylinder head securely fixed to the cylinder block. The cylinder head has an intake port, an exhaust opening and a combustion device-mounting hole formed therein. The lower surface of the cylinder head defines a combustion chamber in cooperation with the inner surface of the cylinder and the upper surface of the piston. The intake port has an intake opening which opens in the lower surface of the cylinder head on one side of a first imaginary plane containing the axis of the cylinder and which communicates with the combustion chamber, and an upper opening which opens in the top face of the cylinder head. The exhaust opening opens in the lower surface of the cylinder head on the other side of the first imaginary plane and communicates with the combustion chamber. The combustion device-mounting hole extends through the cylinder head along the axis of the cylinder and has an upper opening which opens in the top face of the cylinder head. The peripheral edge of the upper opening of the intake port extends along the peripheral edge of the upper opening of the combustion device-mounting hole.

This internal combustion engine is advantageous in that, even in the case where the intake port is formed close to the combustion device-mounting hole, a region of the cylinder head around the combustion device-mounting hole can be efficiently used for the formation of the intake port, so that the intake port can be given the required cross-sectional area. Consequently, the suction efficiency can be improved without increasing the overall length etc. of the engine.

Preferably, the peripheral edge of the upper opening of the combustion-device mounting hole is circular in shape. A portion of the peripheral edge of the upper opening of the intake port close to the upper opening of the combustion device-mounting hole is formed so as to be concavely arcuated with respect to the peripheral edge of the upper opening of the combustion device-mounting hole.

In the internal combustion engine with this preferred arrangement wherein a combustion device-mounting hole having an upper opening with a circular cross section is formed, the intake port can be given the required cross-sectional area by efficiently using a region of the cylinder head around the combustion device-mounting hole.

An internal combustion engine according to another aspect of the present invention comprises a cylinder block having a cylinder formed therein, a piston slidably received in the cylinder, and a cylinder head securely fixed to the cylinder block. The cylinder head has an intake port, an exhaust opening and a combustion device-mounting hole formed therein. The lower surface of the cylinder head defines a combustion chamber in cooperation with the inner surface of the cylinder and the upper surface of the piston. The intake port includes an upstream-side upright part extending from the top face of the cylinder head along the axis of the cylinder, and a downstream-side slanting part communicating with the upstream-side upright part. The downstream-side slanting part has an intake opening which opens in the lower surface of the cylinder head on one side of a first imaginary plane containing the axis of the cylinder and which communicates with the combustion chamber. The exhaust opening opens in the lower surface of the cylinder head on the other side of the first imaginary plane and communicates with the combustion chamber. The combustion device-mounting hole extends through the cylinder head along the axis of the cylinder. The overlapping area of the downstream-side slanting part with the combustion device-mounting hole, observed when the intake port and the combustion device-mounting hole are projected onto a second imaginary plane containing the axis of the cylinder and perpendicular to the first imaginary plane, is smaller than that of the upstream-side upright part with the combustion device-mounting hole.

This internal combustion engine is advantageous in that the intake air flow entering the downstream-side slanting part from the upstream-side upright part of the intake port is deviated outward within the intake port in the radial direction as viewed in traverse section of the intake port, whereby an intense reverse tumble flow can be formed inside the combustion chamber.

Preferably, the distance between the downstream-side slanting part and the axis of the cylinder, observed when the intake port is projected onto the second imaginary plane, increases with decrease in distance to the intake opening.

With this preferred arrangement, the intake air flow passing through the intake port is gradually deviated outward in the radial direction of the cylinder, and therefore, a reverse tumble flow can be formed properly. In the preferred arrangement, the intake port, when viewed in vertical section parallel to the second imaginary plane, is located at a distance from the combustion device-mounting hole. Therefore, in the case where a pair of intake ports are formed on opposite sides of the combustion device-mounting hole in the direction along which the first imaginary plane extends, the two intake ports can be located close to the combustion device-mounting hole when viewed in vertical section parallel to the first imaginary plane. In other words, when viewed in vertical section parallel to the first imaginary plane, the two intake ports can be located such that their downstream-side slanting parts are substantially parallel to each other. This arrangement prevents the collision of intake air flows, so that harmful components in the exhaust gas can be cut down.

An internal combustion engine according to still another aspect of the present invention comprises a cylinder block having a cylinder formed therein, a piston slidably received in the cylinder, and a cylinder head securely fixed to the cylinder block. The cylinder head has an intake port, an exhaust opening and a combustion device-mounting hole formed therein.

The lower surface of the cylinder head defines a combustion chamber in cooperation with the inner surface of the cylinder and the upper surface of the piston. The intake port includes an upstream-side upright part extending from the top face of the cylinder head along the axis of the cylinder, and a downstream-side slanting part communicating with the upstream-side upright part. The upstream-side upright part has an upper opening which opens in the top face of the cylinder head. The downstream-side slanting part has an intake opening which opens in the lower surface of the cylinder head on one side of a first imaginary plane containing the axis of the cylinder and which communicates with the combustion chamber. The exhaust opening opens in the lower surface of the cylinder head on the other side of the first imaginary plane and communicates with the combustion chamber. The combustion device-mounting hole extends through the cylinder head along the axis of the cylinder.

The internal combustion engine further comprises an intake valve for opening and closing the intake opening, a rocker arm for actuating the intake valve, and a lash adjuster, supported by the cylinder head, for eliminating a gap between the intake valve and the rocker arm. The lash adjuster extends along a second imaginary plane containing the axis of the cylinder and perpendicular to the first imaginary plane. The rocker arm extends along the second imaginary plane and is supported at an end portion thereof disposed on the side close to the first imaginary plane by the upper end of the lash adjuster so as to be swingable therearound. A region of the intake port ranging from the upper opening thereof to a portion thereof facing the upper end of the lash adjuster extends in a direction away from the axis of the cylinder when viewed in vertical section parallel to the first imaginary plane.

This internal combustion engine is advantageous in that the intake port can be given the required cross-sectional area by effectively using a region of the cylinder head around the lash adjuster for the formation of the intake port, while preventing the interference between the intake port and the lash adjuster.

In the internal combustion engines according to the above three aspects of the invention, the cylinder head preferably has a plurality of intake ports formed therein. With this preferred arrangement, a uniform reverse tumble flow can be formed inside the combustion chamber.

Also, in the internal combustion engines according to the above three aspects of the invention, the intake ports are preferably formed independently so as not to communicate with one another. With this preferred arrangement, the shape of the intake ports can be relatively freely determined while avoiding the interference of the intake ports with the combustion device-mounting hole.

Further, in the internal combustion engines according to the above three aspects of the invention, the cylinder head preferably has two intake ports formed therein. These two intake ports are formed so as to be symmetrical with respect to the second imaginary plane containing the axis of the cylinder and perpendicular to the first imaginary plane. With this preferred arrangement, it is possible to form a uniform reverse tumble flow inside the combustion chamber.

DETAILED DESCRIPTION OF THE PREFERRED EMBODIMENT

Referring now to the drawings, an internal combustion engine according to one embodiment of the present invention will be described in detail.

Figure 1:
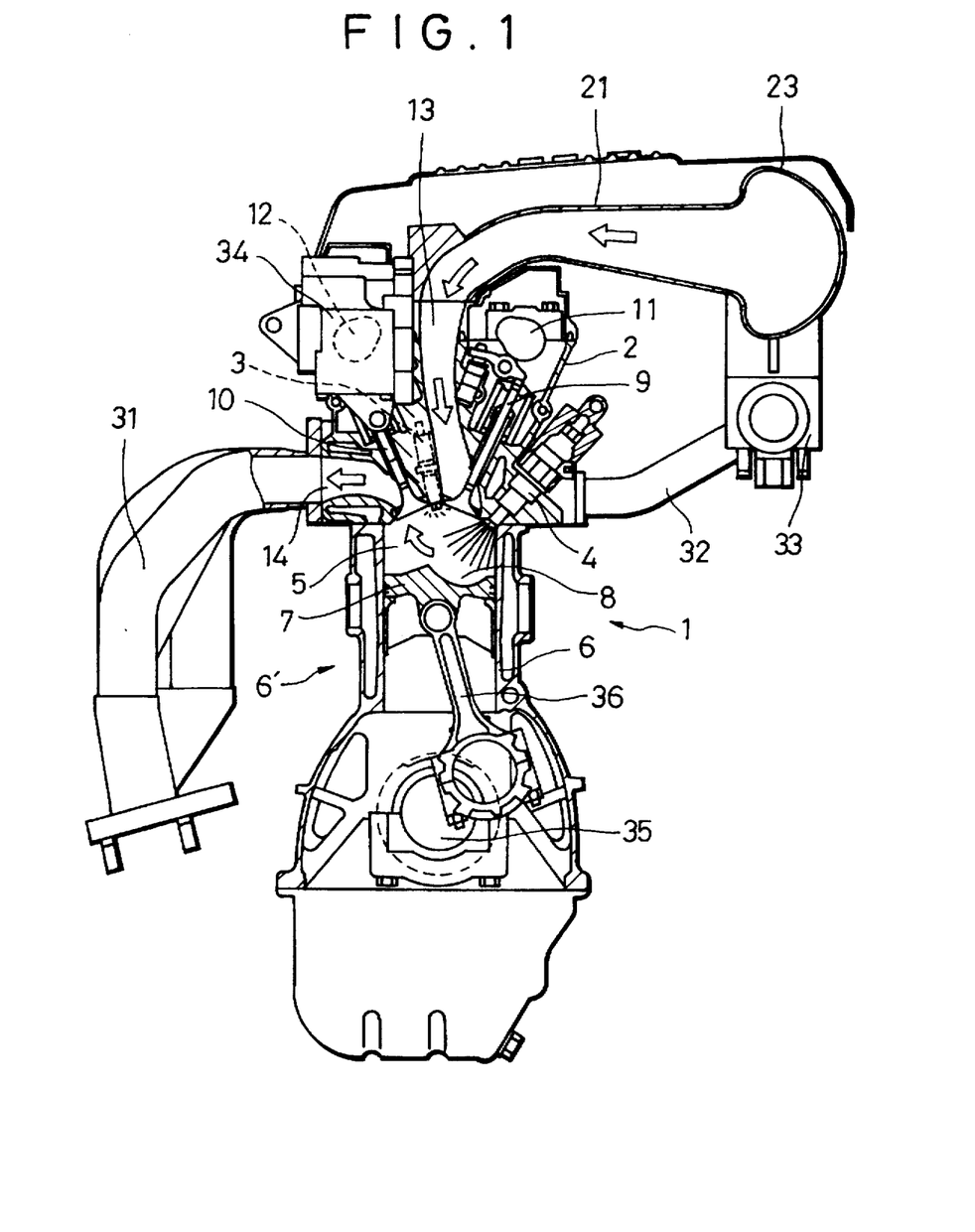
FIG. 1 is a vertical sectional view of a cylinder-injection gasoline engine according to one embodiment of the present invention.

In FIG. 1, reference numeral 1 represents the body of an in-line four-cylinder engine (hereinafter merely referred to as engine) of which the combustion chamber, the intake system, the EGR system, etc. are specially designed for cylinder injection. The engine 1 comprises a cylinder block 6' including four cylinders 6, a cylinder head 2 joined to the upper surface of the cylinder block 6', and four pistons 7 slidably received in corresponding ones of the cylinders 6. A pent roof-type combustion chamber 5, for example, is defined by a lower surface 2a of the cylinder head 2, an inner peripheral surface 6a of each cylinder 6, and an upper surface 7a of the associated piston 7.

To the cylinder head 2 of the engine 1, spark plugs (more generally, combustion devices) 3 and electromagnetic fuel injectors 4 for the respective cylinders are mounted, and fuel is injected from each fuel injector 4 directly into the corresponding combustion chamber 5. Also, a semispherical cavity 8 is formed in the top face 7a of each piston 7 at a location where atomized fuel from the fuel injector 4 can reach when fuel is injected at a later stage of the compression stroke. The engine 1 has a high theoretical compression ratio (in this embodiment, about 12, for example), compared with a manifold-injection type engine. As a valve actuating mechanism, a DOHC four-valve type is employed, and intake and exhaust camshafts 11 and 12 are rotatably supported at the upper part of the cylinder head 2 for actuating intake and exhaust valves 9 and 10, respectively.

An upright intake port 13 is formed in the cylinder head 2 so as to pass between the two camshafts 11 and 12. This intake port 13 has an intake opening 131 (FIG. 2) which opens in the lower surface 2a of the cylinder head 2 on one side of a first imaginary plane S1 (FIG. 5) containing a cylinder axis LC and extending in the lengthwise direction of the engine (in the axial direction of the crankshaft) and which communicates with the combustion chamber 5. Intake air passing through this intake opening 131 forms a reverse tumble flow, described later, within the combustion chamber 5.

In the following description, a plane containing the cylinder axis LC and extending perpendicularly to the first imaginary plane S1 is called second imaginary plane S2.

An exhaust port 14 is also formed in the cylinder head 2 in a substantially horizontal direction, as in ordinary engines. A large-diameter EGR port (not shown) branches off from the exhaust port 14 and extends obliquely downward. The exhaust port 14 has an exhaust opening 141 (FIG. 2) which opens in the lower surface 2a of the cylinder head 2 on the other side of the first imaginary plane S1 opposite to the intake opening 131 and which communicates with the combustion chamber 5.

As shown in FIG. 1, the upright intake port 13 is connected via an intake manifold 21 to a surge tank 23, which in turn is connected to a throttle body, not shown. The exhaust port 14, on the other hand, is connected via an exhaust manifold 31 to an exhaust pipe, not shown, which is provided with a three-way catalyst, a muffler, etc. The EGR port is connected via a large-diameter EGR pipe 32 to an upstream side of the intake manifold 21, and a stepper motor-operated EGR valve 33 is arranged in the EGR pipe 32. In FIG. 1, reference numeral 34 denotes a high-pressure fuel pump which is driven by the exhaust camshaft 12 to produce a discharge pressure of 50 to 60 kg/cm$^2$ or more even during idling of the engine 1. Reference numeral 35 denotes a crankshaft supporting the pistons 7 through respective connecting rods 36.

Figure 2:
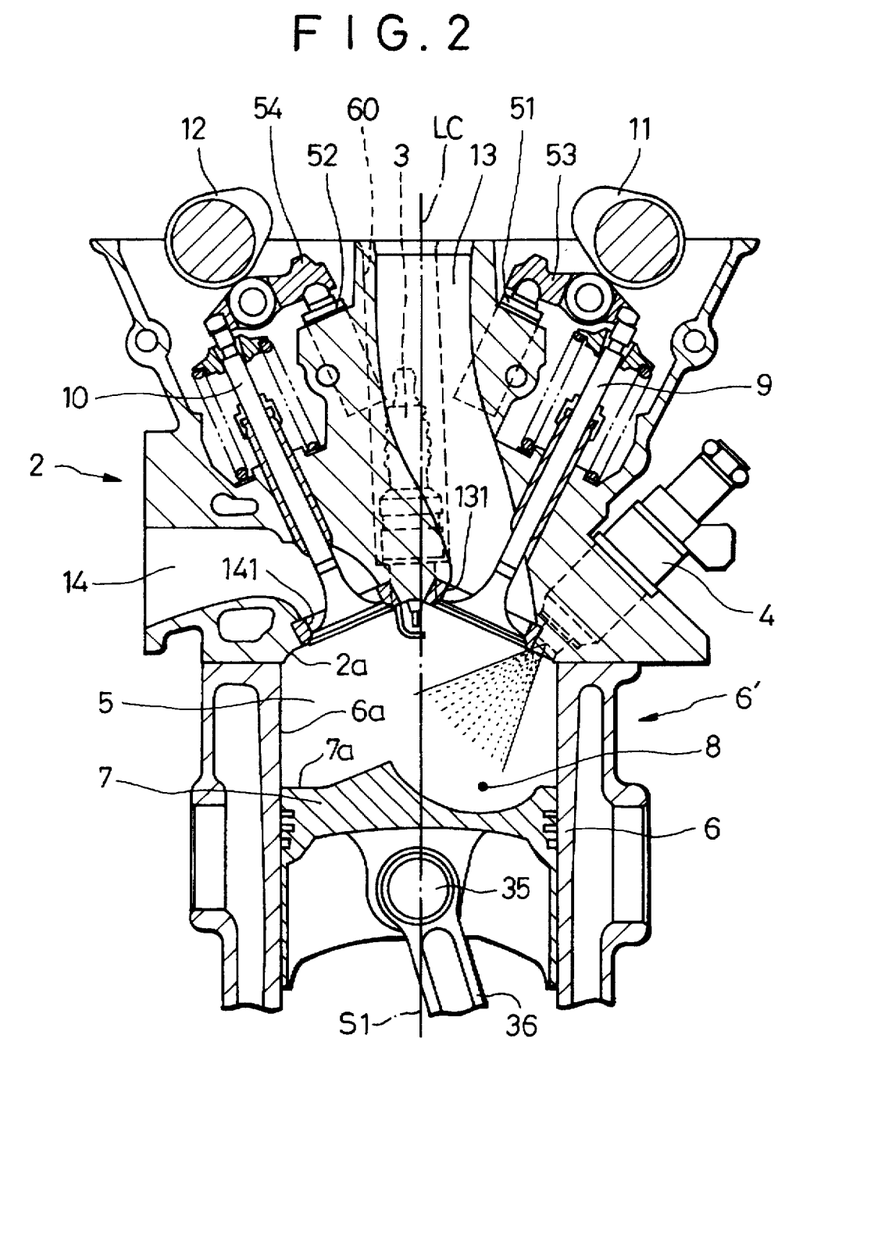
FIG. 2 is an enlarged fragmentary vertical sectional view of a cylinder head and a cylinder shown in FIG. 1.

As shown in FIG. 2, the intake and exhaust valves 9 and 10 are arranged on respective opposite sides of the first imaginary plane Si. Intake- and exhaust-side swing arms 53 and 54 are interposed, respectively, between the intake valve 9 and the intake camshaft 11, and between the exhaust valve 10 and the exhaust camshaft 12. These two swing arms (rocker arms) 53 and 54 extend along the second imaginary plane S2. Hydraulic lash adjusters (hereinafter referred to as HLAs) 51 and 52, which extend obliquely with respect to the cylinder axis LC, are arranged immediately under respective inner end portions of the swing arms 53 and 54 close to the first imaginary plane. The HLAs 51 and 52 are used for adjustment, that is, they respectively eliminate the gap between the intake valve 9 and the swing arm 53 and the gap between the exhaust valve 10 and the swing arm 54. The swing arms 53 and 54 have their inner end portions supported by the upper ends of the respective HLAs 51 and 52, so as to be swingable about the upper ends of the respective HLAs 51 and 52. Namely, in this embodiment, the intake- and exhaust-side HLAs 51 and 52 are each an inner pivot type located between the intake and exhaust camshafts 11 and 12.

A plug hole 60 for receiving the spark plug 3 therein is formed in the cylinder head 2 at a location immediately above the combustion chamber 5 and slightly shifted from the cylinder axis LC toward the exhaust valve 10. This plug hole 60 extends through the cylinder head 2 and is slightly inclined with respect to the cylinder axis LC. The plug hole 60 has a lower opening 601 (FIG. 3) which opens in the lower surface 2a of the cylinder head and an upper opening 602 (FIG. 5) which opens in the top face 2b of the cylinder head.

Figure 3:
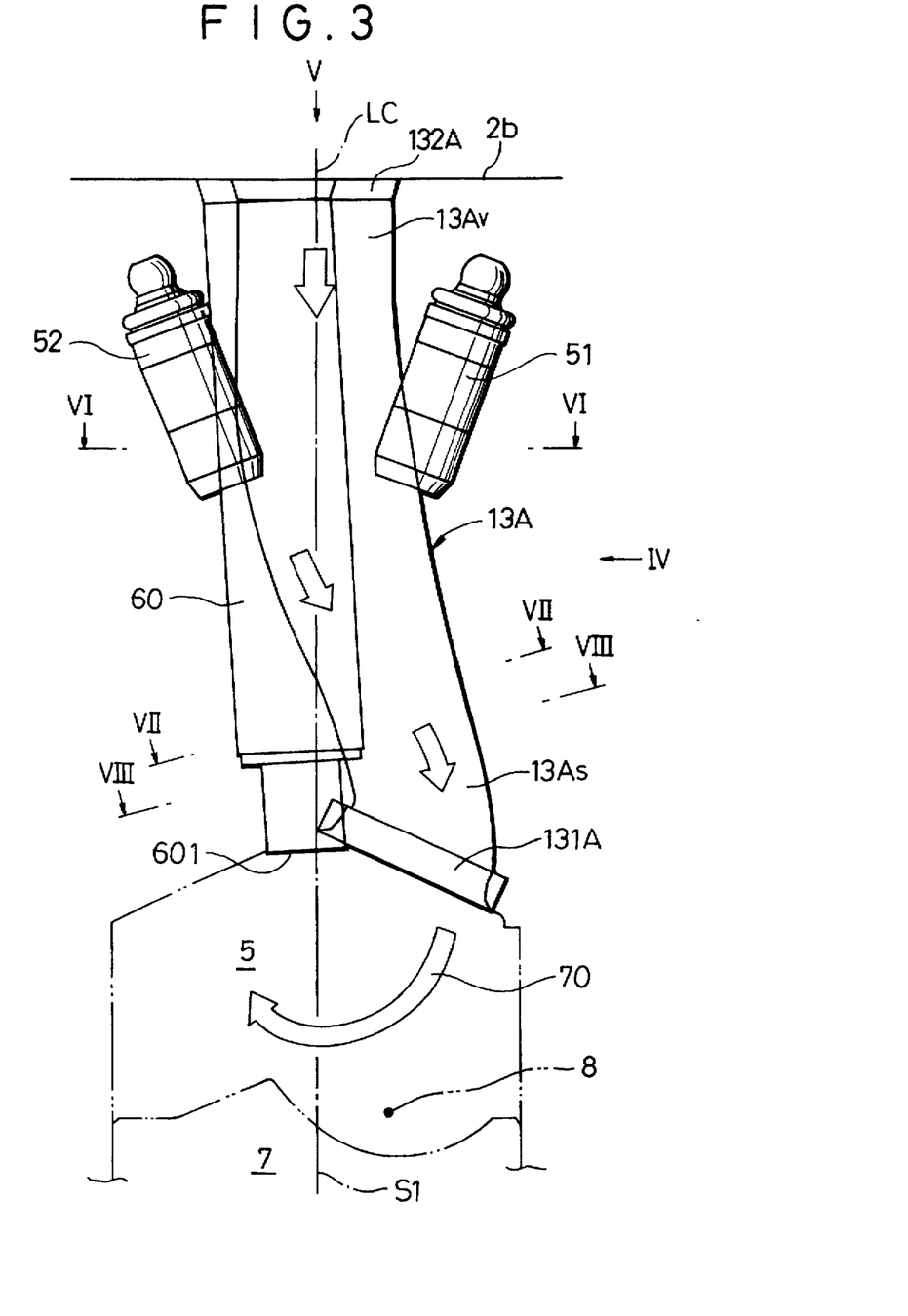
FIG. 3 is a perspective view showing an upright intake port and its surrounding elements.
Figure 4:
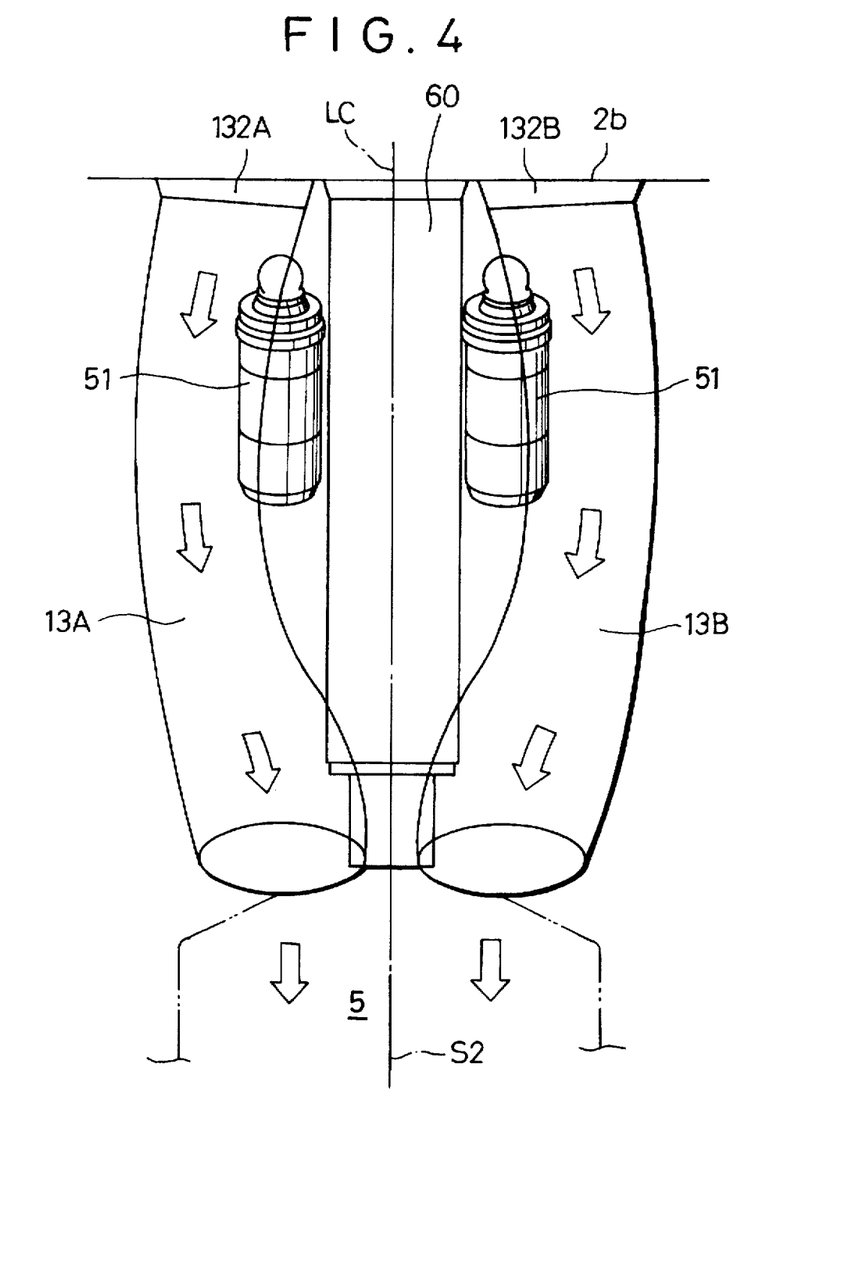
FIG. 4 is a perspective as viewed from position IV shown in FIG. 3.
Figure 5:
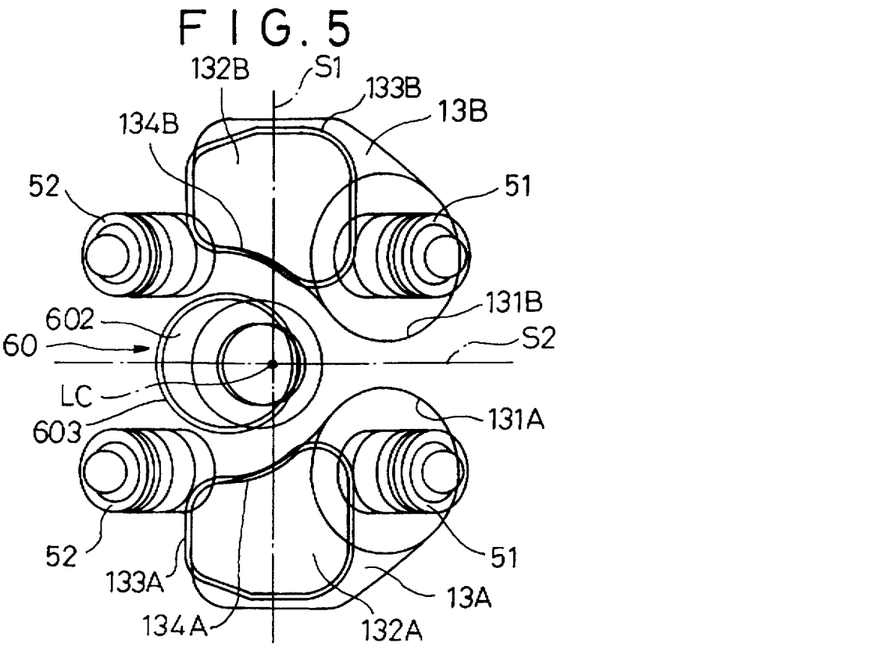
FIG. 5 is a perspective as viewed from position V shown in FIG. 3.

Referring now to FIGS. 3 to 5, the shape of the upright intake port 13 according to this embodiment will be explained.

As shown in FIGS. 3 to 5, the upright intake port 13 of each cylinder 6 comprises a pair of independent intake ports (hereinafter referred to as first and second intake ports) 13A and 13B extending downward from the upper surface 2b of the cylinder head 2. These ports 13A and 13B are located on front and rear sides, respectively, of the plug hole 60 in the lengthwise direction of the engine and are formed so as to be symmetrical with respect to the second imaginary plane S2. The first intake port 13A has an intake opening 131A opening in the lower surface 2a of the cylinder head on one side of the first imaginary plane S1 and communicating with the combustion chamber 5, and an upper opening 132A opening in the top face 2b of the cylinder head 2 (FIG. 3). Similarly, the second intake port 13B has an intake opening 131B (FIG. 5) and an upper opening 132B (FIG. 4). The upper openings 132A and 132B of the first and second intake ports open in the upper surface 2b of the cylinder head 2 at locations frontward and rearward, respectively, with respect to the plug hole 60 in the lengthwise direction of the engine. Peripheral edges 133A and 133B of the upper openings 132A and 132B of the first and second intake ports 13A and 13B are curved in such a manner that their edge portions 134A and 134B close to the upper opening 602 of the plug hole 60 extend along the peripheral edge 603 of the upper opening 602 of the plug hole 60 with a sufficient distance therefrom. In the case where the peripheral edge of the upper opening 602 of the plug hole 60 is circular in shape as shown in FIG. 5, the above portions 134A and 134B of the peripheral edges of the intake ports are concavely arcuated with respect to the peripheral edge of the opening 602 of the plug hole. This makes it possible to position the intake ports 13A and 13B closer to the cylinder axis LC, whereby the dimension of the engine 1 in the longitudinal direction (overall engine length) can be reduced while maintaining the required cross-sectional area of the individual intake ports 13A and 13B.

Figure 6:
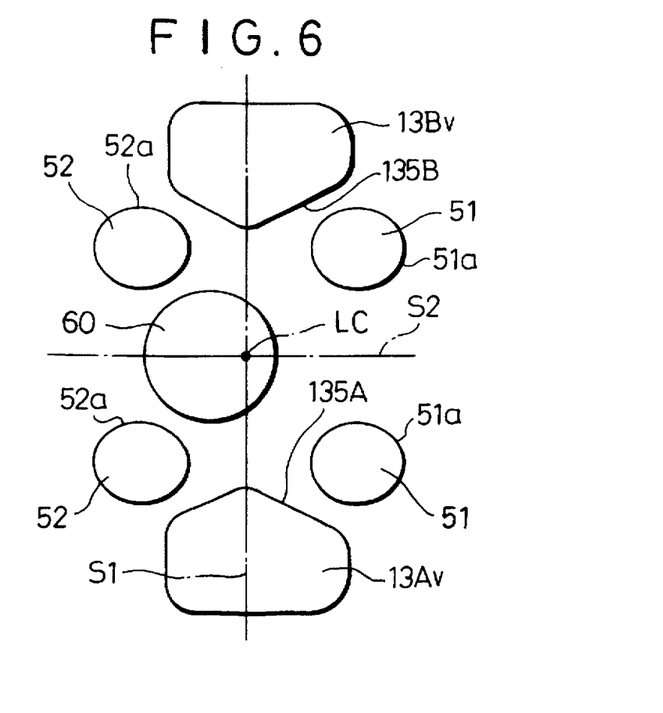
FIG. 6 is a sectional view taken along line VI—VI in FIG. 3.
Figure 7:
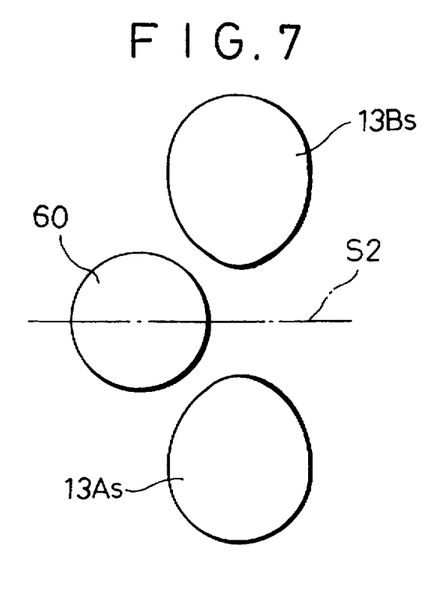
FIG. 7 is a sectional view taken along line VII—VII in FIG. 3.
Figure 8:
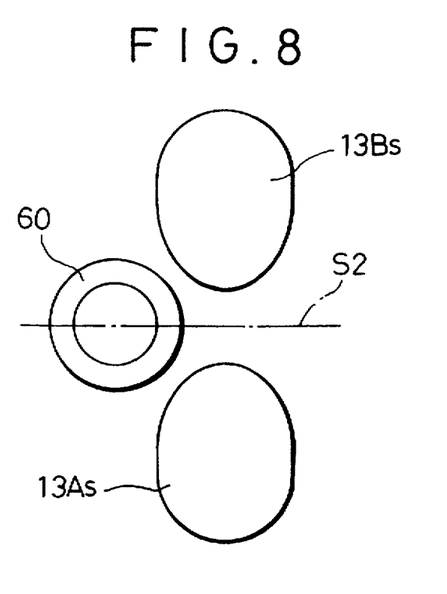
FIG. 8 is a sectional view taken along line VIII—VIII in FIG. 3.

When viewed in vertical section parallel to the second imaginary plane (that is, in FIG. 3), the first intake port 13A includes an upstream-side upright part 13Av extending downward from the upper surface 2b of the cylinder head 2 along the cylinder axis LC, and a downstream-side slanting part 13As smoothly connecting with the upstream-side upright part 13Av and communicating therewith. The downstream-side slanting part 13As extends downward from the upstream-side upright part 13Av to the intake opening 131A and obliquely with respect to the cylinder axis LC. The horizontal distance between the slanting part 13As and the cylinder axis LC increases with decrease in a vertical distance to the intake opening 131A or between the intake opening and the location at which the horizontal distance is measured. The overlapping area (per unit length of the intake port) of the downstream-side slanting part 13As with the plug hole 60, observed when the intake port 13A and the plug hole 60 are projected onto the second imaginary plane S2, is smaller than the overlapping area of the upstream-side upright part 13Av with the plug hole 60. Similarly, the second intake port 13B includes an upstream-side upright part 13Bv (FIG. 6) and a downstream-side slanting part 13Bs (FIGS. 7 and 8). Each of the slanting parts 13As and 13Bs is formed such that its traverse cross-sectional shape gradually flattens while at the same time its dimension in the width direction of the engine decreases with decrease in vertical distance to the respective intake opening 131A, 131B (FIG. 5) opening to the combustion chamber 5. On the other hand, the dimension of each slanting part 13As, 13Bs in the lengthwise direction of the engine gradually and slightly increases with decrease in distance to the respective intake opening 131A, 131B, thereby permitting each slanting part to have a sufficient traverse cross-sectional area throughout its length to the respective intake opening 131A, 131B.

In this embodiment, the first and second intake ports 13A and 13B each have the aforementioned overall shape, as viewed from the front side, and the traverse cross-sectional shape; therefore, the intake air flow (indicated by arrows) once approaches the cylinder axis LC as it advances from the upright part 13Av, 13Bv to the slanting part 13As, 13Bs, and then the intake air flow takes its course away from the cylinder axis LC as it approaches the intake opening 131A, 131B. Also, since the width of each slanting part 13As, 13Bs gradually narrows, the intake air flow in the slanting part is gradually concentrated or aggregated as it approaches the intake opening. Thus, the intake air flows into the combustion chamber 5 at a location remote from the cylinder axis, so that an intense reverse tumble flow 70 is formed along the cavity 8 in the top face of the piston 7.

When viewed in vertical section parallel to the first imaginary plane S1 (that is, in FIG. 4), a region of each of the first and second intake ports 13A and 13B ranging from the upper opening 132A, 132B to a portion facing the upper end of the respective HLA 51, 52 extends obliquely downward, that is, in a direction away from the HLA 51, 52. Also, a region of each intake port 13A, 13B adjacent to the HLA 51, 52 (a region ranging from the portion facing the upper end of the HLA 51, 52 to a portion facing the lower end of the same) extends substantially parallel to the cylinder axis LC while maintaining a predetermined distance (in this embodiment, several millimeters) or more between the intake port 13A, 13B and the HLA 51, 52. As shown in FIG. 6, the region of each intake port 13A, 13B adjacent to the HLA 51, 52 has a slightly smaller dimension in the lengthwise direction of the engine than the upper opening 132A, 132B and has a slightly greater dimension in the width direction of the engine than the upper opening 132A, 132B, thus ensuring the necessary and sufficient traverse cross-sectional area of the intake port. Further, when the region of each intake port 13A, 13B adjacent to the HLA 51, 52 is viewed in horizontal section perpendicular to both the first and second imaginary planes Si and S2, a portion of the peripheral edge 135A, 135B of the intake port 13A, 13B facing the HLA 51, 52 extends along the outer surface 51a, 52a of the HLA 51, 52, whereby the required cross-sectional area can be provided without increasing the length of the engine.

As shown in FIG. 4, the downstream-side slanting parts 13As and 13Bs of the intake ports 13A and 13B extend obliquely with respect to the cylinder axis LC in such a manner that they gradually become closer to the plug hole 60 with decrease in distance to the combustion chamber 5, and then extend substantially parallel to the cylinder axis LC. Consequently, the flows of intake air from the intake ports 13A and 13B enter the combustion chamber 5 while advancing substantially parallel to each other, whereby turbulence is prevented from being caused by the collision of the intake air flows.

As described above, the upright intake port 13 formed in the cylinder head 2 according to this embodiment can smoothly introduce intake air into the combustion chamber 5 while at the same time maintaining the distance to the intake/exhaust-side HLA 51, 52 or to the plug hole 60. Accordingly, an intense reverse tumble flow can be formed within the combustion chamber 5 and turbulence induced by the collision of intake air flows can be prevented, thus improving the thermal efficiency.

Also, since this embodiment employs the upright intake port 13 and the inner pivot-type intake- and exhaust-side swing arms 53 and 54, the distance between the intake and exhaust camshafts 11 and 12 can be reduced. This makes it possible to decrease the width of the cylinder head 2, thus improving the mounting capacity of the engine in the engine room, reducing the weight of the engine and enlarging the space for mounting the valve actuating system. In addition, the intake and exhaust camshafts 11 and 12 can be coupled by scissors gears or the like, without the need to reduce the angle between the intake and exhaust valves 9 and 10.

Further, in this embodiment, the intake- and exhaust-side swing arms 53 and 54 are an inner pivot type, and therefore, the mounting angle of the fuel injector 4 (the angle between the fuel injector and the cylinder axis LC) can be made small, whereby the performance of the engine is improved. The reason is as follows. When a cylinder-injection gasoline engine is operating in a low-load region such as during idling, fuel is injected into the cavity 8 in the top face of the piston 7 at a later stage of the compression stroke. Accordingly, in order to enhance the controllability of fuel injection during the low-load operating region, fuel should desirably be injected into the cavity 8 even when the position of the piston 7 is relatively low. In other words, since in this embodiment the mounting angle of the fuel injector 4 can be made small, dispersion of atomized fuel to the outside of the cavity 8 lessens even when the injection time is advanced or the injection time period is prolonged, whereby the engine output and the fuel consumption can be improved and also harmful components in the exhaust gas produced due to imperfect combustion can be cut down.

In a high-load operating region, fuel is injected at a former stage of the suction stroke, and in this case, atomized fuel should desirably be mixed uniformly with air inside the combustion chamber 5 so that the adhesion of fuel to the inner surface of the cylinder can be minimized. In other words, since in this embodiment the mounting angle of the fuel injector 4 can be made small, adhesion of atomized fuel from the fuel injector 4 to the inner surface of the cylinder lessens, thus making it possible to enhance the engine output as well as to reduce harmful components in the exhaust gas produced due to imperfect combustion.

The foregoing is a description of the specific embodiment, but it should be noted that the present invention is not limited to the above embodiment. For example, although in the above embodiment the present invention is applied to an in-line four-cylinder four-valve type cylinder-injection gasoline engine, it may be applied to an engine having a different number or arrangement of cylinders such as a single-cylinder engine or a V-type six-cylinder engine, a three- or five-valve engine, or to a manifold-injection gasoline engine. Also, in the above embodiment, the first imaginary plane S1 is parallel to the axis of the crankshaft, but it may be inclined at a desired angle with respect to the axis of the crankshaft. In the embodiment described above, moreover, the present invention is applied to an arrangement wherein the spark plug is positioned at the center of the combustion chamber and the fuel injector is arranged at one side of the same chamber, but it may be applied to an arrangement wherein the spark plug and the fuel injector are positioned conversely. Further, it is to be noted that the construction of the apparatus, the shape of the upright intake port, etc. can be modified without departing from the gist of the present invention.

What is claimed is:

1. An internal combustion engine, comprising:
   a cylinder block having a cylinder formed therein;
   a piston slidably received in the cylinder; and
   a cylinder head securely fixed to said cylinder block, said cylinder head having a plurality of intake ports formed independently so as not to communicate with one another, an exhaust opening, and a combustion device-mounting hole formed therein, a lower surface of said cylinder head defining a combustion chamber in cooperation with an inner surface of the cylinder and an upper surface of the piston,
   wherein each of said plurality of intake ports has an intake opening which opens in the lower surface of said cylinder head on one side of a first imaginary plane containing an axis of the cylinder and which communicates with the combustion chamber, and an upper opening which opens in a top face of said cylinder head,
   the exhaust opening opens in the lower surface of said cylinder head on another side of the first imaginary plane and communicates with the combustion chamber,
   the combustion device-mounting hole extends through said cylinder head along the axis of the cylinder and has an upper opening which opens in the top face of said cylinder head, and
   a peripheral edge of the upper opening of each intake port in the top face of said cylinder head extends along a peripheral edge of the upper opening of the combustion device-mounting hole.

2. The internal combustion engine according to claim 1, wherein the peripheral edge of the upper opening of the combustion-device mounting hole is circular in shape, and
   a portion of the peripheral edge of the upper opening of the intake port close to the upper opening of the combustion device-mounting hole is formed so as to be concavely arcuated with respect to the peripheral edge of the upper opening of the combustion device-mounting hole.

3. The internal combustion engine according to claim 1, wherein said cylinder head is formed with two intake ports each corresponding to said intake port, and
   said two intake ports are formed so as to be symmetrical with respect to a second imaginary plane containing the axis of the cylinder and perpendicular to the first imaginary plane.

4. An internal combustion engine, comprising:
   a cylinder block having a cylinder formed therein;
   a piston slidably received in the cylinder; and
   a cylinder head securely fixed to said cylinder block, said cylinder head having an intake port, an exhaust opening and a combustion device-mounting hole formed therein, a lower surface of said cylinder head defining a combustion chamber in cooperation with an inner surface of the cylinder and an upper surface of the piston, wherein the intake port includes an upstream-side upright part extending from a top face of said cylinder head along an axis of the cylinder, and a downstream-side slanting part communicating with the upstream-side upright part, the downstream-side slanting part has an intake opening which opens in the lower surface of said cylinder head on one side of a first imaginary plane containing the axis of the cylinder and which communicates with the combustion chamber, the exhaust opening opens in the lower surface of said cylinder head on another side of the first imaginary plane and communicates with the combustion chamber, the combustion device-mounting hole extends through said cylinder head along the axis of the cylinder, and an overlapping area of the downstream-side slanting part with the combustion device-mounting hole, observed when the intake port and the combustion device-mounting hole are projected onto a second imaginary plane containing the axis of the cylinder and perpendicular to the first imaginary plane, is smaller than an overlapping area of the upstream-side upright part with the combustion device-mounting hole.

5. The internal combustion engine according to claim 4, wherein a distance between the downstream-side slanting part and the axis of the cylinder, observed when the intake port is projected onto the second imaginary plane, increases with decrease in distance to the intake opening.

6. The internal combustion engine according to claim 4, wherein said cylinder head is formed with a plurality of intake ports each corresponding to said intake port.

7. The internal combustion engine according to claim 6, wherein said plurality of intake ports are formed independently so as not to communicate with one another.

8. The internal combustion engine according to claim 5, wherein said cylinder head is formed with two intake ports each corresponding to said intake port, and said two intake ports are formed so as to be symmetrical with respect to the second imaginary plane.

9. An internal combustion engine, comprising:

a cylinder block having a cylinder formed therein;

a piston slidably received in the cylinder;

a cylinder head securely fixed to said cylinder block, said cylinder head having an intake port, an exhaust opening and a combustion device-mounting hole formed therein, a lower surface of said cylinder head defining a combustion chamber in cooperation with an inner surface of the cylinder and an upper surface of the piston, the intake port including an upstream-side upright part extending from a top face of said cylinder head along an axis of the cylinder and a downstream-side slanting part communicating with the upstream-side upright part, the upstream-side upright part having an upper opening which opens in the top face of said cylinder head, the downstream-side slanting part having an intake opening which opens in the lower surface of said cylinder head on one side of a first imaginary plane containing the axis of the cylinder and which communicates with the combustion chamber, the exhaust opening being opened in the lower surface of said cylinder head on another side of the first imaginary plane and communicating with the combustion chamber, the combustion device-mounting hole extending through said cylinder head along the axis of the cylinder;

an intake valve for opening and closing the intake opening;

a rocker arm for actuating said intake valve; and a lash adjuster, supported by said cylinder head, for eliminating a gap between said intake valve and said rocker arm, said lash adjuster extending along a second imaginary plane containing the axis of the cylinder and perpendicular to the first imaginary plane, said rocker arm extending along the second imaginary plane and being swingably supported at an end portion thereof disposed on a side close to the first imaginary plane by an upper end of said lash adjuster, and a region of the intake port ranging from the upper opening thereof to a portion thereof facing the upper end of said lash adjuster extending in a direction away from the axis of the cylinder when viewed in vertical section parallel to the first imaginary plane.

10. The internal combustion engine according to claim 9, wherein a portion of a peripheral edge of the intake port facing said lash adjuster extends along an outer surface of said lash adjuster when viewed in cross section perpendicular to both the first and second imaginary planes.

11. The internal combustion engine according to claim 9, wherein said cylinder head is formed with a plurality of intake ports each corresponding to said intake port.

12. The internal combustion engine according to claim 11, wherein said plurality of intake ports are formed independently so as not to communicate with one another.

13. The internal combustion engine according to claim 9, wherein said cylinder head is formed with two intake ports each corresponding to said intake port, and said two intake ports are formed so as to be symmetrical with respect to the second imaginary plane.

14. The internal combustion engine according to claim 9, wherein the combustion device-mounting hole has an upper opening which opens in the top face of said cylinder head, and a peripheral edge of the upper opening of the intake port extends along a peripheral edge of the upper opening of the combustion device-mounting hole.

15. The internal combustion engine according to claim 9, wherein an overlapping area of the downstream-side slanting part with the combustion device-mounting hole, observed when the intake port and the combustion device-mounting hole are projected onto the second imaginary plane, is smaller than an overlapping area of the upstream-side upright part with the combustion device-mounting hole.

16. The internal combustion engine according to claim 15, wherein a distance between the downstream-side slanting part and the axis of the cylinder, observed when the intake port is projected onto the second imaginary plane, increases with decrease in distance to the intake opening.

* * * * *